United States Patent [19]

Brown

[11] Patent Number: 4,618,294
[45] Date of Patent: Oct. 21, 1986

[54] CONCRETE FEEDER APPARATUS

[75] Inventor: Warren D. Brown, Birmingham, Mich.

[73] Assignee: Sprayton Equipment Company, Birmingham, Mich.

[21] Appl. No.: 697,493

[22] Filed: Feb. 1, 1985

[51] Int. Cl.⁴ .......................................... B65G 53/46
[52] U.S. Cl. .................................... 406/113; 222/427; 222/485; 366/10; 366/50; 366/338; 406/63; 406/119
[58] Field of Search ...................... 406/63, 64, 66, 92, 406/113, 119, 128, 130; 222/427, 428, 442, 452, 485, 630; 366/10, 12, 13, 50, 51, 338

[56] References Cited

U.S. PATENT DOCUMENTS

| | | | |
|---|---|---|---|
| 1,096,623 | 5/1914 | Girtanner | 406/92 X |
| 2,314,031 | 3/1943 | Colburn | 406/63 |
| 2,515,735 | 7/1950 | Saunders | 222/427 |
| 2,792,151 | 5/1957 | Wagner | 406/92 X |
| 3,076,580 | 2/1963 | Heath | 406/63 |
| 3,224,606 | 12/1965 | Schnyder | 222/427 X |
| 3,311,421 | 3/1967 | Heinemann | 406/63 |
| 3,347,415 | 10/1967 | Strom | 222/427 X |
| 4,154,486 | 5/1979 | Nishikawa | 406/63 X |
| 4,407,436 | 10/1983 | Broadfoot et al. | 222/427 X |

FOREIGN PATENT DOCUMENTS 2415975  10/1975  Fed. Rep. of Germany ........ 406/63

Primary Examiner—Jeffrey V. Nase
Attorney, Agent, or Firm—Harness, Dickey & Pierce

[57] ABSTRACT

An improved concrete apparatus is disclosed herein which is particularly well suited for a wide variety of applications wherein it is necessary to supply a granulated or powdered material in either wet or dry form to a remote worksite. The apparatus of the present invention employs a rotary valving arrangement whereby a plurality of charging bowls may be successively supplied with the desired material and thereafter evacuated under pressure into a central mixing chamber from where the material is conveyed to a suitable conduit which in turn conducts the material to the desired worksite again under pressure. The apparatus includes feeding arrangements whereby water, air, or other desired additives may be automatically fed into and mixed with the material in the mixing chamber before it reaches the remote application nozzle thus affording a greater time for proper absorption of water or the like by the material.

14 Claims, 8 Drawing Figures

CONCRETE FEEDER APPARATUS

BACKGROUND AND SUMMARY OF THE INVENTION

The present invention relates generally to apparatus for receiving and transmitting powdered or granular materials such as for example sand, cement, gravel or the like and more particularly to such apparatus which is specifically designed to provide a continuous pressurized supply of such materials in either a dry or wet form.

There exist a wide variety of applications wherein it is desirable to be able to transport powdered or granular materials or mixtures thereof with water in a substantially continuous manner through suitable conduit means for placement at a remote worksite. Such applications may range from placement of concrete in the construction of various types of wall, roof or floor structures such as swimming pools, tunnels or of refractory materials or to the transporting of gravel or crushed stone to a roof deck.

Various types of appartus have been developed over the years in an effort to handle the variety of available materials in either wet or dry form and yet still be economical in both cost of manufacture as well as operation thereof. Generally, the prior apparatus may be categorized as either tank type or rotary type.

Tank type apparatus tend to be expensive to manufacture and to operate and are rather limited in the types of work for which they are suited. Further, they tend to be prone to clogging at the tank outlet when used for "dry mix" applications particularly when the sand is too damp. However, if the sand used in the mix is dried to too great a degree before use, excessive "fall off" of the material when sprayed will occur. Also, as water is normally added at the nozzle end of the conduit in such applications, there seems to be insufficient time for absorption thereof by the cement which may result in excessive shrinkage cracking of the finished work. In order to overcome those problems it is often necessary to employ a separate predampener to add the proper moisture to the mixture prior to being placed in the tank.

Rotary type apparatus on the other hand tend to be much less expensive to build and operate but often require a relatively high degree of maintenance due to the problems associated with wear resulting from incursion of the powdered or granular materials. The problem of clogging is often encountered in the rotary type machines as well.

It is also noted that prior apparatus of this type has generally not been well suited for the introduction of the various types of additives be they in the form of liquids such as synthetic rubber emulsions (latex) or solids such as steel or polymeric composition fibers. While it has been possible to introduce the various liquid or powdered admixtures into the material prior to processing through the respective apparatus, the introduction of such additives as polymeric and particularly steel fibers therein results in greatly increased wear and tear on the various valves and seals provided therein.

The present invention overcomes these problems in providing a concrete material feed apparatus which is particularly well suited for a wide variety of applications be it wall, roof or floor construction by wet or dry mixtures of granulated or powdered materials. Further, the present apparatus is well suited to accommodate the introduction of virtually any type of additives, such as solids, liquids, or gases into the mixture without appreciable increase in the wear or resulting life expectancy of the various components. The present invention provides a plurality of stationary charging chambers each of which is successively filled with material from a supply hopper by gravity flow via a rotating valve assembly which thereafter operates to air pressurize the chambers and eject the material therein into a central mixing chamber. The shape and contour of the respective charging chambers as well as the location of the openings for admission of pressurized fluid thereto are particularly designed to assure a smooth clog-free flow of material into the central mixing chamber without regard to the moisture content thereof. Further, agitators are provided within the hopper so as to assure free flow of material into the respective charging chambers.

The central mixing chamber is also provided with conduit means in fluid communication therewith which are well suited for conducting virtually any type of additive to the mixture immediately prior to its being supplied to the distribution conduit. In this manner the additives bypass the various critical moving valving components of the apparatus and the potentially excessive wear and tear generated thereby is all but eliminated. Further, not only does the ability to inject the majority of the water into the mixing chamber versus adding it at the discharge nozzle afford a greater time period to assure proper hydration of the cement, but the provision of a central mixing chamber also aids in insuring a smoother steadier non-pulsating flow of material to the operator's nozzle.

It should also be noted that the design of the present apparatus is not only well suited to provide long, efficient trouble-free operation but also replacement of the component moving parts which are held to a minimum is greatly facilitated thereby. Thus, not only is the present invention well suited for a variety of applications, it is also designed to provide cost savings both in terms of manufacturing as well as operation thereof.

Additional advantages and features of the present invention will become apparent from the subsequent description and the appended claims taken in conjunction with the accompanying drawings.

BRIEF DESCRIPTION OF THE DRAWINGS

FIG. 5 is a fragmentary section view of a portion of the feed apparatus shown in FIG. 1, the section being taken along a horizontal plane passing through the conically shaped hopper;

DESCRIPTION OF THE PREFERRED EMBODIMENTS

Figure 1:
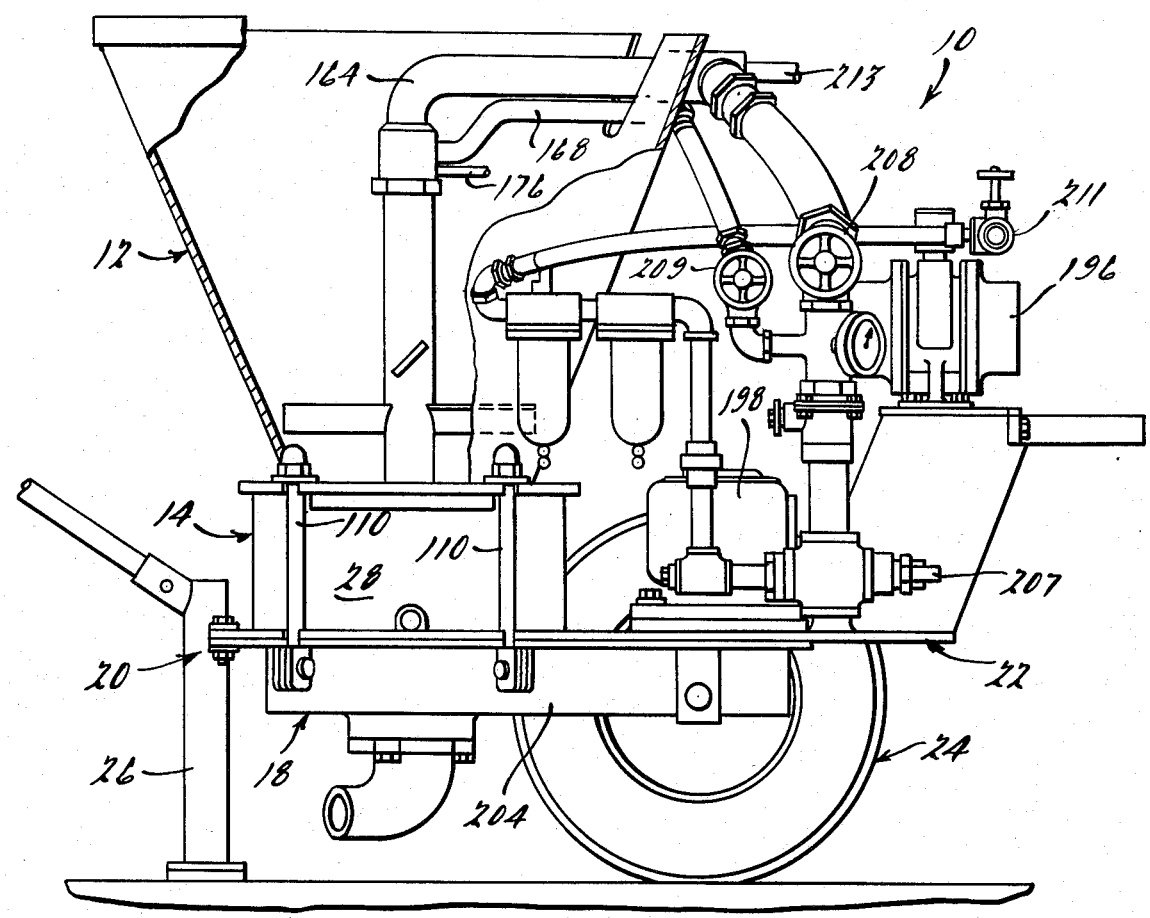
FIG. 1 is a side elevational view of a concrete feed apparatus in accordance with the present invention.

Referring now to the drawings, there is shown a concrete feeder indicated generally by reference number 10 which is particularly well suited for supplying various types of powdered or granulated materials in either dry or wet form under pressure to a remotely located worksite for placement. As shown, concrete feeder 10 comprises a hopper 12 into which the material to be fed is placed, a charging bowl assembly 14, a mixing chamber assembly 16 and associated drive means 18 all of which are shown mounted on a suitable mobile platform 20.

Feeder apparatus 10 is secured to a supporting platform 22 which in turn is supported on the ground by means of a suitable wheel and axle assembly 24 and a leveling jack 26 at one end. It should be noted that while feeder apparatus 10 is shown being supported upon a wheeled platform for ease of mobility, it may also be supported on skids or directly mounted upon a suitable vehicle should this be desired for a particular application.

Charging bowl assembly 14 comprises a generally cylindrically shaped outer housing 28 within which is fixedly secured a generally circular bowl-shaped member 30 having generally arcuately shaped radially inwardly curving sidewalls. An opening 32 is provided in the bottom of bowl-shaped member 30 within which a generally cylindrically shaped tube 34 is secured which tube 34 projects axially upwardly through the interior of bowl-shaped member 30. A plurality of generally vertically oriented partitions 36 are also provided within bowl-shaped member being secured to and extending generally radially outwardly from cylindrical tube 34 to the sidewalls of bowl-shaped member 30 so as to divide the interior thereof into a plurality of substantially equally sized chambers 38.

Figure 3:
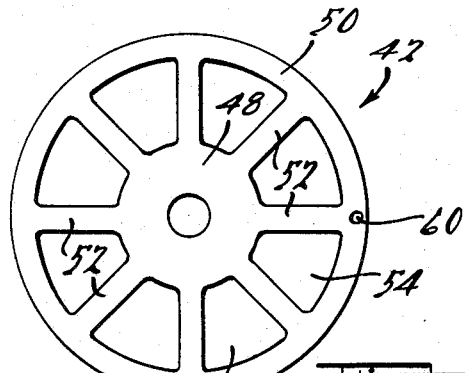
FIG. 3 is an enlarged plan view of the wear plate incorporated in the feed apparatus of FIG. 1.

A rotating valving assembly 40 is provided for selectively controlling flow of the granulated or powdered material from hopper 12 into the respective chambers 38 of the charging bowl member 30 and comprises a generally circular wear plate 42 having a diameter slightly greater than the inside diameter of the open upper end 44 of bowl-shaped member 30 so as to enable it to be supported by a recessed shoulder 46 extending around the inner periphery of the bowl-shaped member 30. As best seen with reference to FIG. 3, wear plate 42 comprises radially inner and outer circular portions 48 and 50 interconnected by a plurality of generally radially extending spoke members 52 which together define a plurality of circumferentially spaced pie-shaped openings 54 therethrough. The spoke members 52 will preferably be equal in number to and positioned in aligned overlying relationship with respect to partitions 36 such that each generally pie-shaped opening 54 in wear plate 42 will afford relatively free access to respective ones of the plurality of chambers 38 in bowl-shaped member 30.

The radially inner circular portion 50 of wear plate 42 is of a diameter approximately equal to that of upwardly projecting tube 34 and is designed to engage and be supported by the upper end thereof. Suitable gasket or other sealing means 56 and 58 are provided between wear plate 42 and both tube 34 and bowl-shaped member 30 respectively. Additionally, one or more suitable pins 60 may be provided extending between wear plate 42 and bowl-shaped member 30 so as to restrain wear plate 42 from rotating with respect thereto.

Valve assembly 40 also includes a valve plate 62 and associated air distributor plate 64 which are removably secured together by means of a plurality of suitable fasteners such as bolts 66 and are each rotatably supported in coaxial overlying relationship to wear plate 42. As shown, both valve plate 62 and air distributor plate 64 have relatively large arcuate openings 68, 70 extending therethrough. Preferably, openings 68 and 70 will be coextensive and each will extend circumferentially a distance such that the opposite radially extending edges 72, 74 thereof are generally diametrically opposed.

Air distributor plate 64 is of a diameter somewhat less than valve plate 62 and has a pair of angularly spaced generally radially extending passages 76, 78 which extend from a center opening 80 in air distributor plate 64 to adjacent the periphery thereof. Passages 76 and 78 are adapted to conduct a pressurized fluid such as compressed air to the chambers 38 within bowl-shaped member 30. Preferably, the angular spacing of passages 76 and 78 will be less than the angular spacing between partitions 36 whereby both passages 76 and 78 may operate simultaneously to supply pressurized fluid to a single chamber 38 for a period of time sufficient to insure substantially complete ejection of the material contained therein.

Valve plate 62 also has a center opening 82 and a pair of relatively large radially outwardly and angularly spaced openings 84, 86 adjacent the outer periphery thereof and a second pair of smaller openings 88, 90 radially aligned with and inwardly spaced from respective openings 84, 86. The angular spacing of openings 84, 88 and 86, 90 is such as to place one large and one small opening in communication with each of the respective passageways 76 and 78 provided in air distributor plate 64. An exhaust port 92 is also provided in valve plate 62 adjacent the outer periphery thereof and angularly spaced from openings 84, 88 and 86, 90. Exhaust port 92 extends only partially through valve plate 62 and opens into a generally radially outwardly extending exhaust passage 94 which extends outwardly through the peripheral edge of valve plate 62. Also, a suitable rubber or synthetic gasket 96 having appropriately spaced openings therein aligned with openings 84, 86, 88, 90 and 92 is interposed between valve plate 62 and air distributor plate 64 so as to prevent leakage of pressurized fluid. A scraper blade 98 is also secured to valve plate 62 and air distributor plate 64 extending along a trailing radially extending edge of aligned openings 68, 70 provided therein. preferably scraper blade 98 will be inclined slightly and positioned so as to pass in engaging or very close proximity to the respective spokes 52 provided on wear plate 42 so as to thereby clearll any material therefrom before the closed or covering portion of valve plate 62 moves thereacross.

A generally conically shaped hopper 12 having an open top and bottom is secured to an annular radially outwardly extending flange portion 100 which in turn is pivotably secured by means of a pair of suitable hinges 102 to cylindrically shaped outer housing 28 so as to allow hopper 12 to be swung outwardly to afford access to the charging bowl assembly 14 and overlying wear plate 42 and valve plate 62 and air distributor plate 64. This tiltable hopper arrangement facilitates access to the interior of charging bowl assembly 14 and valve plate assembly 40 for both maintenance as well as clean up. As best seen with reference to FIG. 2, the inside diameter of annular flange 100 is slightly greater than the diameter of air distributor plate 62 and is positioned in surrounding relationship thereto. An annular recess 104 is provided in the lower surface of flange portion 100 extending around the inner periphery thereof within which is disposed in part a suitable dust seal assembly 106. The lower surface of dust seal assembly 106 bears against the upper surface of valve plate 62 so as to maintain the periphery thereof in engagement with wear plate 42 as well as to aid in retaining wear plate 42 seated against shoulder 46 of bowl member 30. One or more set screws 108 are provided in flange 100 extending through dust seal assembly 106 and operate to prevent relative rotation thereof. A plurality of swing bolts 110 are provided in order to secure hopper 12 in an upstanding position and to provide a biasing action against the outer periphery of valve plate 62 so as to prevent leakage of material and/or pressurized fluid. Swing bolts 110 are pivotably secured at their lower ends in circumferentially spaced relationship to support platform 22 and are received within suitable slots 112 in the outer periphery of flange portion 100 at their upper ends.

A mixing chamber assembly 16 is also provided being coaxially disposed within tube 34 and extending downwardly therefrom through an opening 114 provided in supporting platform 22. Mixing chamber assembly 16 comprises an elongated tubular member 116 rotatably supported coaxially within tube 34 by suitable axially spaced bearing means 118, 120, 122, the interior 126 of which defines the mixing chamber. The lower end of tubular member 116 is open and is adapted to have a suitable fitting 128 secured thereto to which suitable conduit means may be attached through which the granular or powdered material may be transported to the remotely located worksite for placement. Suitable seals 130 are interposed between the abutting non-rotating end of fitting 128 and the lower end 132 of tubular member 116.

In order to enable flow of material from the respective charging chambers 38, an opening 134 is provided in the sidewall of tubular member 116 adjacent but spaced from the upper end thereof. Opening 134 is adapted to move sequentially into and out of alignment with corresponding circumferentially spaced openings 136 provided in tubular member 34 adjacent the lower end thereof. Opening 134 will, of course, be circumferentially aligned with the pressurized fluid passages 76, 78 and openings 84, 86, 88, 90 provided in air distributor plate 64 and valve plate 62 such that a selected chamber 38 will be open to the mixing chamber 126 while pressurized fluid is being supplied thereto by both sets of openings 84, 86, 88, 90 in valve plate 62. Suitable annular seals 138, 140 are also provided between tubular member 34 and an intermediate relatively short sleeve member 141 being positioned immediately adjacent opposite axial ends of openings 134 and 136 so as to prevent leakage of the material therebetween. Further, suitable axially extending bar seals 142 are provided extending between the axial spaced seals 134 and 136 and located on axial opposite sides of each of the openings 136 provided in tubular member 34 so as to prevent circumferential leakage of the material between respective chambers 38. Preferably, bar seals 142 will be of the type disclosed in my U.S. Pat. No. 4,142,708 issued Mar. 6, 1979.

The upper end of tubular member 116 has a chamber closure cap 144 telescopically received therein and secured thereto. As best seen with reference to FIG. 2, mixing chamber closure cap 144 is suitably secured to tubular member 116 such as by pins 146 so as to be rotatable therewith and has secured within a threaded opening 148 provided therein a nozzle bushing 150 which also operates to support in depending relationship a helical auger 152 within mixing chamber 126. Sleeve member 141 extends along the outer peripheral surface of closure cap 144 and operates to retain pins 146 in position. It should also be noted that sleeve member 141 also includes an opening 154 in the sidewall thereof adjacent the lower end which is aligned with and of substantially identical size to opening 134 in tubular member 116.

Telescopically received within the upper end of opening 148 in closure cap 144 and fixedly secured thereto is a tubular sleeve 156 which extends upwardly through wear plate 42, valve plate 62 and distributor plate 64 and into an outer sleeve member 158. An inner sleeve member 160 is also threadedly received within a reduced diameter threaded portion 162 of opening 148 and extends concentrically upwardly through sleeve members 156 and 158 and projects upwardly a substantial distance beyond the upper ends thereof. A suitable pressurized fluid supply fitting 164 is secured in fluid communication with inner sleeve 160 by means of a swivel connector 166.

Swivel connector 166 further includes a secondary pressurized fluid supply connection 168 provided in the sidewall of housing member 170 which communicates with an annular axially extending passageway 172 defined between inner and outer sleeves 160, 158 at the upper end and extends downwardly between inner sleeve 160 and sleeve 156 at the lower end thereof. An opening 174 is provided in the sidewall of sleeve 156 spaced from the lower end thereof which opening 174 is aligned and communicates with respective radial passages 76, 78 provided in distributor plate 64.

Figure 2:
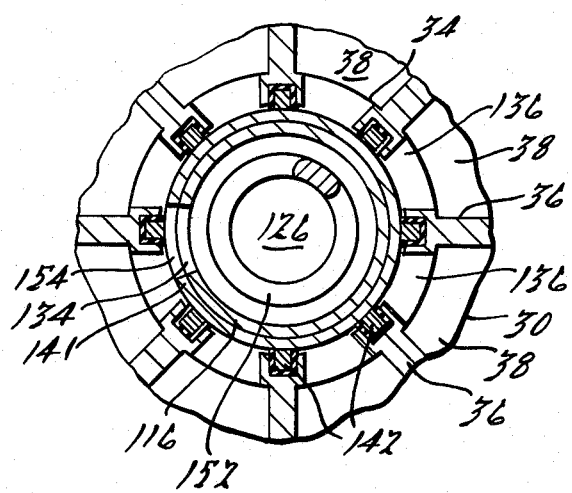
FIG. 2 is an enlarged fragmentary section view showing the hopper, charging and mixing portions of the feed appartus of FIG. 1, all in accordance with the present invention.
Figure 4:
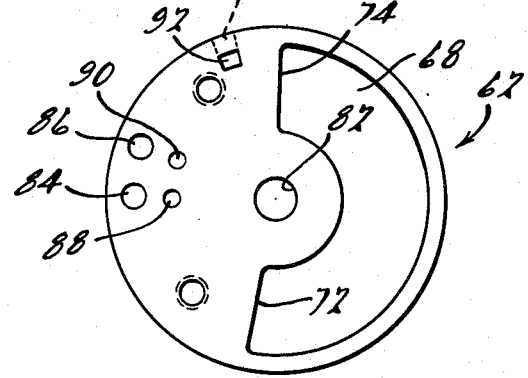
FIG. 4 is an enlarged plan view of the valve plate incorporated in the present invention as viewed from the bottom side thereof.
Figure 2:
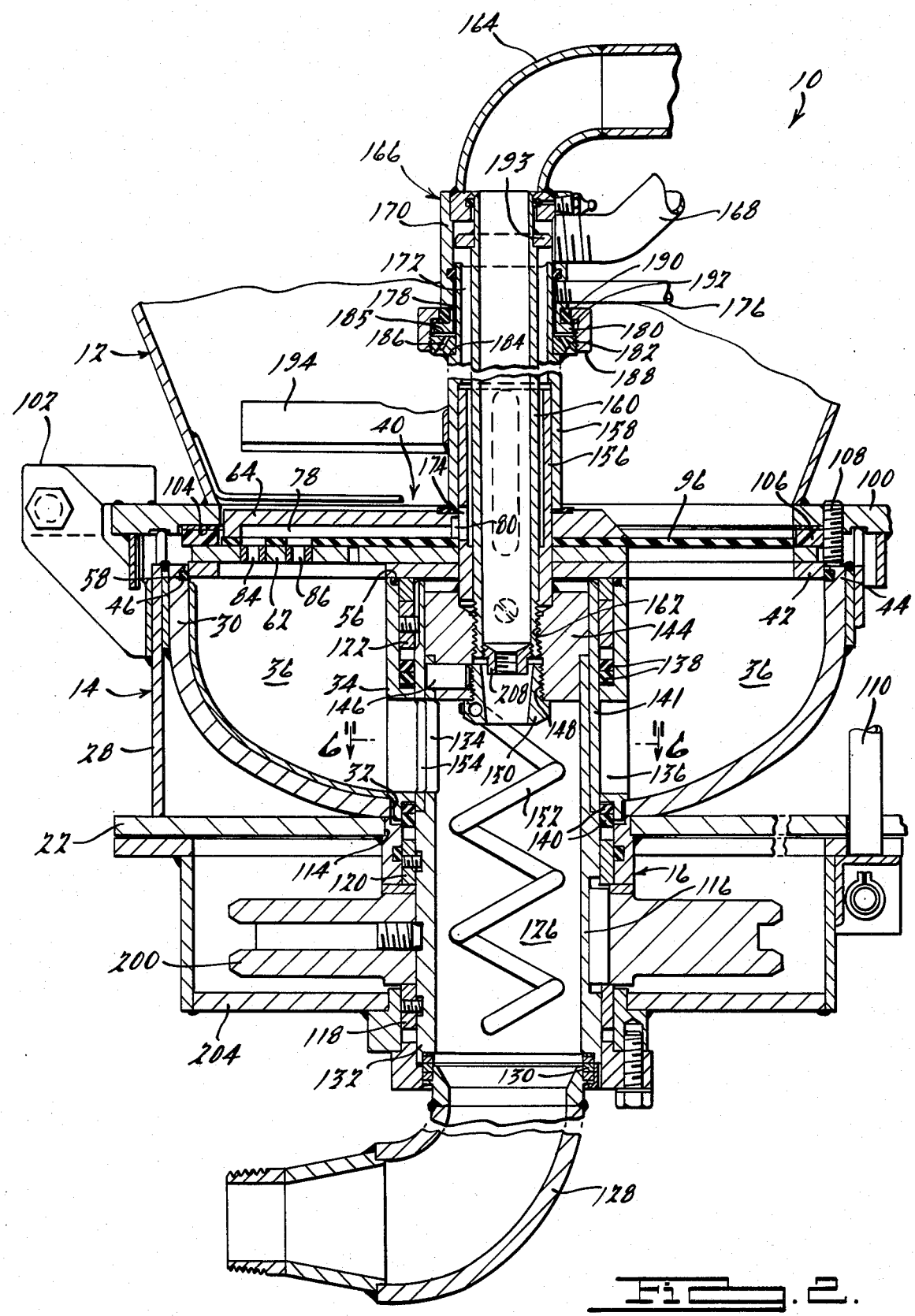
Figure 6:
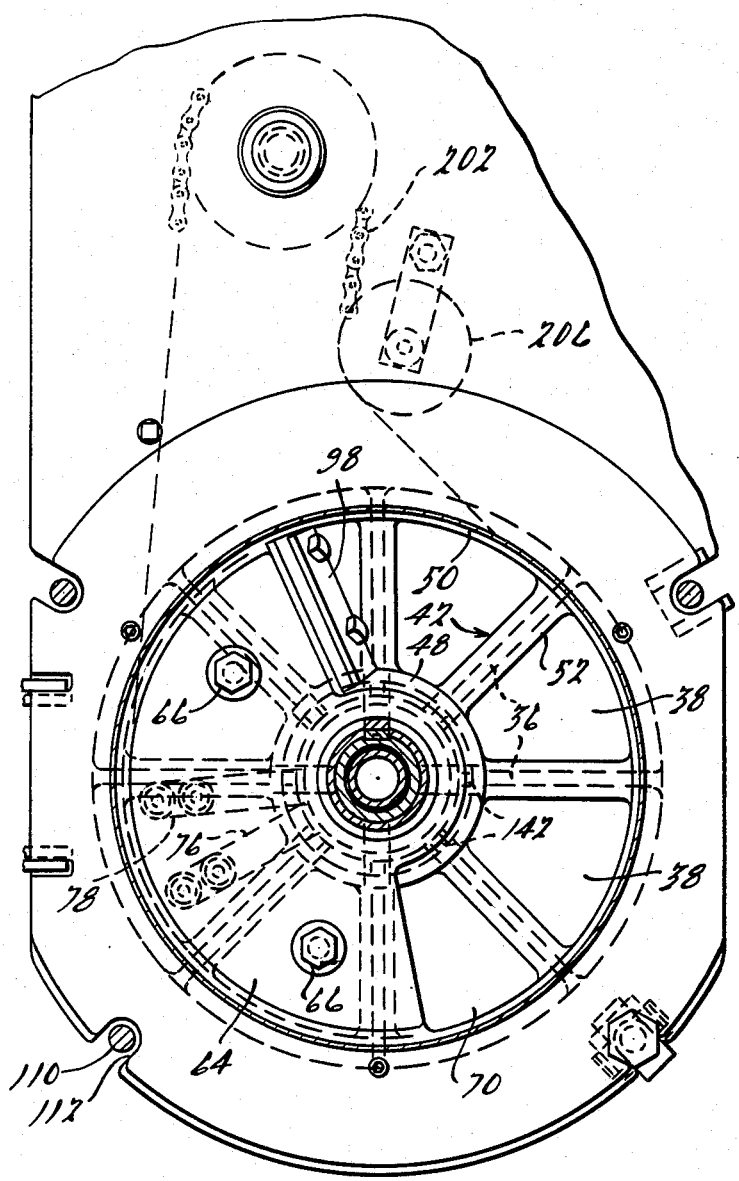
FIG. 6 is also a fragmentary section view of the feed apparatus of FIGS. 1 and 2, the section being taken along lines 6—6 of FIG. 2.

A third fluid supply connection 176 is also provided in the sidewall of housing 170 and opens into another axially downwardly extending annular passage 178 defined between the sidewall of housing 170 and an upper extension of outer sleeve member 158. As shown in FIG. 2, the lower end of this annular passage 178 opens into a plurality of radially outwardly extending passages 185 defined between a radially outwardly extending flange portion 180 of housing 170 and an annular nozzle ring 182 seated against and secured to a shoulder 184 provided on outer sleeve member 158. Annular nozzle ring 182 has a plurality of circumferentially spaced downwardly projecting nozzles 186 communicating with respective radial passages 185 through which fluid may be discharged into the interior of hopper 12.

Housing 170 of swivel connection 166 is secured to outer sleeve member 158 by means of a threaded ring 188 which engages the threaded periphery of nozzle ring 182 and suitable seals 190, 192 are provided therein whereby ring 188 is able to rotate with respect to housing 170. Additional seals are also provided within swivel connection 166 to prevent fluid leakage between the respective passages 172, 178 and the interior of sleeve 160.

While valve plate 62 and wear plate 42 are primarily clamped around their periphery against charging bowl 30 by the action of swing bolts 110, additional center clamping force may be exerted thereon by tightening of nut 193 which is secured to and will rotate sleeve 160 the other end of which is threadedly received within closure cap 144. As the lower surface of nut 193 bears against upper end of sleeve 158, rotation of nut 193 in a tightening direction will operate to exert a downward pressure on sleeve 158 and hence distributor plate 64 against which the lower end of sleeve 158 bears.

In order to prevent clogging of material within hopper 12, a plurality of agitators 194 are secured to sleeve 158 in circumferentially spaced relationship and are designed to be rotated through and thereby stir the material supply contained within hopper 12 so as to assure free flow under gravity thereof into the successive charging chambers 38. Preferably, at least one or more of agitators 194 will be positioned in closely spaced overlying relationship to distributor plate 64 so as to assure no clogging will occur at the opening provided therein.

The drive means comprise a suitable power source mounted on the mobile platform such as an air motor 196 which is drivingly connected to a suitable speed reducer 198. The output of speed reducer 198 is drivingly connected to tubular member 116 preferably by means of a sprocket 200 and chain drive arrangement 202 enclosed within a suitable housing 204 secured to the underside of support platform 22. Sprocket 200 in turn is fixedly secured to the lower portion of tubular member 116 so as to operate to rotatably drive same. A suitable idler wheel 206 may be provided to maintain a desired tension on drive chain 202.

In operation, a granulated or powdered material which is to be supplied to the remote worksite is fed into hopper 12. This material may be either wet or dry such as a concrete from a redimix truck or in the form of sand, cement, gravel or the like. A suitable source of pressurized fluid such as and preferably compressed air must also be provided which may be connected to an inlet valving arrangement provided on platform 22.

As shown in FIG. 1, inlet valving arrangement comprises a suitable inlet connection 207 to which a supply of pressurized fluid such as and preferably compressed air may be connected. Compressed air from inlet 207 is supplied via suitable piping to air motor 196 and also to both pressurized fluid inlets 164 and 168. Suitable valving 208, 209 and 211 may also be prvided to control the volume of air flow to respective inlets 164, 168 and air motor 196.

Upon energization of air motor 196 or any other desired suitable power source, chain 202 will operate to drive sprocket 200 thereby rotatably driving tubular member 116 to which it is keyed. As chamber closure cap 144, sleeve member 141 and sleeve members 156, 158 and 160 as well as valve plate 62 and air distributor plate 64 are all keyed or otherwise drivingly secured together, driving forces imparted to sprocket 200 will operate to impart rotary motion thereto.

As valve plate 62 and distributor plate 64 rotate aligned openings 68 and 70 clockwise as seen in FIG. 5, they move into overlying relationship to successive chambers 38 thereby allowing material contained within hopper 12 to fill same under the forces of gravity. The rotational movement of agitators 194 will insure that the material does not become compacted and/or hung up within hopper 12 and thus aid in assuring substantially complete filling of the successive chambers 38.

As valve plate assembly 40 rotates, scraper blade 98 will be moved across wear plate 42 and operate to clear the material away from the upper surface thereof and allow valve plate 62 to close off access to respective chambers 38.

As valve plate 62 and distributor plate 64 continue to rotate, openings 84, 86, 88 and 90 will move into overlying relationship with a chamber 38 which has been previously filled with material from hopper 12 thereby placing the respective chambers 38 in fluid communication with compressed air supplied from connection 168 via axial passage 172 and radially extending passages 76 and 78 in air distributor plate 64. Simultaneously with the pressurization of chamber 38, openings 134 and 154 will move into alignment with opening 136 in tubular member 34 thereby placing chamber 38 in communication with mixing chamber 126. The compressed air supplied to chamber 38 will operate to exhaust the material therein into mixing chamber 126.

Additional compressed air is supplied to mixing chamber 126 via supply connection 164, the axial passage provided within sleeve member 160 and opening 148 in closure cap 144. Further, if desired, various other materials or additives may be metered into the air flow entering via supply connection 164 which will be intermixed with the material supplied from hopper 12 via chambers 38 by the rotating action of agitator 152. In order to supply such additives or other materials, an auxiliary supply line 213 and suitable metering valving (not shown) may be provided to feed these materials into the air flow at a controlled rate upstream of fitting 164. Typical of such additives or additional materials may be additional water, latex or other types of additives, or steel or plastic fibers all of which may be commonly desired to be intermixed with a concrete mixture. It should be noted that the inner end of sleeve 160 is internally threaded whereby a reducer nozzle 208 of any desired size may be fitted therein so as to reduce the flow of compressed air and/or other materials if desired.

Compressed air supplied via both connections 168 and 164 will operate to convey the material from mixing chamber 126 downwardly and outwardly through fitting 128 and a suitable delivery hose connected thereto to the remotely located worksite.

As air distributor plate and valve plate continue to rotate, sleeves 116 and 141 will close off communication between chamber 38 and mixing chamber 126 while openings 84, 86, 88 and 90 are moved into communication with the next successive chamber 38 whereupon the above process is repeated. When the preceding chamber 38 has been fully closed off from communication with both mixing chamber 126 and air passages 84, 86, 88 and 90, continued movement of valve plate will cause exhaust port 92 to move into fluid communication with the now empty but still pressurized chamber 38 whereby it may be allowed to exhaust to atmosphere thereby readying it for refilling from hopper 12.

It should also be noted that in some cases it may be desirable to premoisten or prewet the material contained within hopper 12 so as to reduce the dust generated therefrom or to allow a greater time period for adsorption of water by the material. In order to accomplish this, a supply of water or the like is connected via suitable control valving to connection 176 whereby the fluid may be sprayed into hopper 12 via orifices 186 provided in nozzle ring 182.

Figure 7:
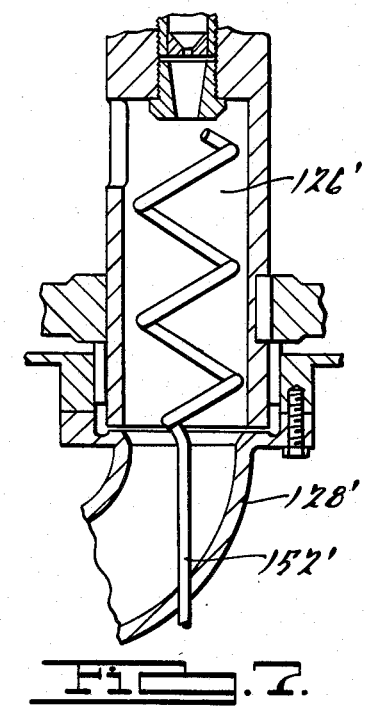
FIG. 7 is a fragmentary view of the mixing chamber forming a part of the present invention but showing an alternative arrangement for supporting the agitator therein.
Figure 8:
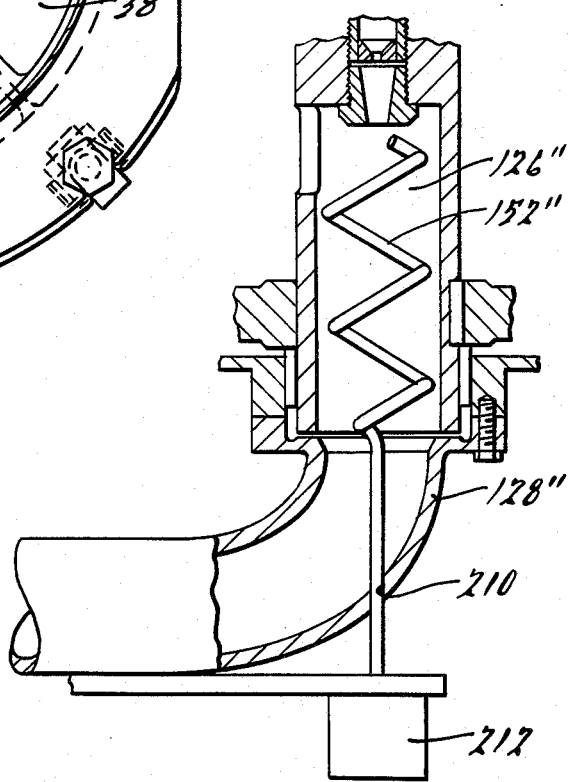
FIG. 8 is a view similar to that of FIG. 7 but showing a still further alternative arrangement for providing an independently power driven agitator in the mixing chamber.

Referring now to FIGS. 7 and 8, there are shown two alternative arrangements whereby agitator 152 may be positioned within mixing chamber if desired. In FIG. 7, agitator 152' is fixedly secured within an opening provided in discharge fitting 128'. Thus material flowing through mixing chamber 126' will be caused to rotate around agitator 152' which will be held stationary therein. In FIG. 8, agitator 152" has an extended shaft which projects through a suitably sealed opening 210 provided in discharge fitting 128". A suitable drive motor 212 is coupled thereto and operates to rotationally drive same. It should be noted that drive motor 212 may be of any suitable type desired for the application such as for example a variable speed motor whereby the degree of mixing achieved within mixing chamber 126" may be controlled depending on the type and quantity of additives being fed through supply 164 or other factors.

As may now be appreciated, the present apparatus is well designed to provide an efficient and relatively low cost machine suitable for supplying a wide variety of materials to a remotely located worksite. The present invention utilizes a minimal number of moving parts and incorporates means for introducing additives to the mixture in such a manner as to insure relatively longlasting, reliable, trouble-free operation yet affords ready access to the moving parts whereby necessary maintenance may be performed with a minimum of downtime.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. A receiver and transmitter of granular material such as concrete comprising:

a hopper;

a plurality of charging chambers positioned below said hopper, said chambers being arranged in an annular array and having radially inwardly facing openings therein;

rotating valve means between said hopper and said chambers for successively opening and closing top ends of said chambers whereby said chambers may be filled with said material;

vertically extending tubular rotating means connected in depending relationship to said rotating valve means, said tubular means defining a mixing chamber and including means for selectively placing said mixing chamber in communication with successive ones of said charging chambers via said radially inwardly facing openings;

first radially extending passage means in said rotating valve means for directing first fluid flow into successive ones of said chambers when said top end is closed;

stationary outlet means non-rigidly attached to one end of said tubular means;

extension tube means projecting upwardly through said hopper from said tubular rotating means beyond said rotating valve means, said extension tube means being drivingly secured to said tubular rotating means and including second and third passage means therethrough, said second passage means communicating with said first passage means and said third passage means opening into said mixing chamber;

rotating hopper mixing blades attached to extension tube means;

mixing means in said mixing chamber for dispersing fluid flow from said third passage means in said material flow, and drive means attached to the outside of said mixing chamber and operative to effect rotation of said valve means, said tubular rotating means, and said extension tube means.

2. A receiver and transmitter of granular material such as concrete comprising:

a hopper adapted to contain a supply of said material;

an annular array of charging chambers positioned in non-rotating underlying relationship to said hopper;

rotary valve means interposed between said hopper and said array of charging chambers, said valve means being operative to selectively place successive ones of said charging chambers in communication with said hopper whereby they are filled with said material;

each of said charging chambers having a generally radially inwardly directed opening positioned adjacent the lower end thereof so as to facilitate full discharge of said material;

a rotatable tubular member positioned coaxially within said array of charging chambers and defining a mixing chamber open at the lower end thereof, said tubular member including an opening in the sidewall thereof successively alignable with said radially inwardly directed openings in said charging chambers whereby material may move from respective ones of said charging chambers into said mixing chamber as said tubular member is rotated;

means within said tubular member defining a fluid passage opening into said mixing chamber at the upper end thereof whereby one or more additives may be added to said material which has been received within said mixing chamber;

agitator means within said mixing chamber, said agitator means being operative to intermix said material and said additives.

3. A receiver and transmitter of granular material as set forth in claim 2 wherein said agitator means is supported for rotation with said tubular member.

4. A receiver and transmitter of granular material as set forth in claim 2 wherein said agitator means is rotatably supported within said mixing chamber and includes means for rotatably driving same.

5. A receiver and transmitter of granular material as set forth in claim 2 wherein said means defining a fluid passageway is sized to accommodate additives include solids.

6. A receiver and transmitter of granular material as set forth in claim 2 wherein said tubular member further includes nozzle means removably positioned within said fluid passage, said nozzle means being operative to limit flow of said additives into said mixing chamber.

7. A receiver and transmitter of granular material as set forth in claim 2 wherein said rotary valve means comprise a circular valve plate assembly having a circumferentially extending opening therein through which material may flow from said hopper to said charging chambers, said opening being of a size to extend over one or more of said charging chambers.

8. A receiver and transmitter of granular material as set forth in claim 7 wherein said valve plate assembly further includes passage means for conducting a pressurized fluid into successive ones of said charging chambers as said valve plate assembly is rotated thereover, said pressurized fluid being operative to aid in ejecting said material into said mixing chamber.

9. A receiver and transmitter of granular material as set forth in claim 8 wherein said valve plate assembly comprises a valve plate and distributor plate secured together, said distributor plate having a radially extending fluid passage provided therein for conducting said pressurized fluid from additional passage means provided in said tubular member to openings provided in said valve plate.

10. A receiver and transmitter of granular material as set forth in claim 9 wherein said passage means and said additional passage means are connected via fluid conduits to a common source of pressurized fluid.

11. A receiver and transmitter of granular material as set forth in claim 10 wherein each of said fluid conduits include valve means therein for independently controlling the rate of flow of said fluid.

12. A receiver and transmitter of granular material as set forth in claim 2 wherein said mixing chamber has an outlet positioned in coaxial relationship with the axis of rotation thereof.

13. A receiver and transmitter as set forth in claim 2 further comprising nozzle means secured to said tubular member and positioned within said hopper and operative to selectively admit fluid into said material within said hopper and second fluid passage means within said tubular member for conducting said fluid to said nozzle means.

14. A receiver and transmitter as set forth in claim 2 further comprising nozzle means in said fluid passage at the upper end of said mixing chamber.

* * * * *